United States Patent
Lopez et al.

(10) Patent No.: US 11,373,050 B2
(45) Date of Patent: Jun. 28, 2022

(54) NETWORK CONTROL ENTITY, AN ACCESS POINT AND METHODS THEREIN FOR ENABLING ACCESS TO WIRELESS TAGS IN A WIRELESS COMMUNICATIONS NETWORK

(71) Applicant: Telefonaktiebolaget LM Ericsson (publ), Stockholm (SE)

(72) Inventors: Miguel Lopez, Solna (SE); Hugo Tullberg, Nyköping (SE); Imadur Rahman, Sollentuna (SE); Göran N. Klang, Enskede (SE); Thomas Unshelm, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/979,899

(22) PCT Filed: Jun. 27, 2018

(86) PCT No.: PCT/SE2018/050692
§ 371 (c)(1),
(2) Date: Sep. 11, 2020

(87) PCT Pub. No.: WO2020/005126
PCT Pub. Date: Jan. 2, 2020

(65) Prior Publication Data
US 2021/0012071 A1 Jan. 14, 2021

(51) Int. Cl.
*G06K 7/10* (2006.01)
*H04W 4/38* (2018.01)

(52) U.S. Cl.
CPC ..... *G06K 7/10188* (2013.01); *G06K 7/10029* (2013.01); *G06K 7/10069* (2013.01); *G06K 7/10297* (2013.01); *H04W 4/38* (2018.02)

(58) Field of Classification Search
CPC ............ G06K 7/10188; G06K 7/10029; G06K 7/10069; G06K 7/10297; G06K 7/10009;
(Continued)

(56) References Cited

U.S. PATENT DOCUMENTS 5,940,006 A * 8/1999 MacLellan ......... G06K 17/0022
370/314
7,420,458 B1 * 9/2008 Kuzma ................ G06Q 10/087
340/10.34
(Continued)

FOREIGN PATENT DOCUMENTS

CA 3041667 A1 5/2018
WO 2007146221 A2 12/2007

OTHER PUBLICATIONS

PCT International Search Report and Written Opinion dated Apr. 23, 2019 for International Application PCT/SE2018/050692, 10 Pages.
(Continued)

*Primary Examiner* — Edwin C Holloway, III
(74) *Attorney, Agent, or Firm* — Sage Patent Group (57) ABSTRACT

A method performed in a network control entity for enabling access to a wireless tag in a wireless communications network is provided. The wireless communications network includes two or more access points, APs. The network control entity configures a first AP to transmit a radio frequency signal in a first time period, and configures a second AP to receive, in the first time period, a radio signal reflected from the wireless tag using the transmitted radio frequency signal. A network control entity for enabling access to at least one wireless tag in a wireless communications network is also provided.

Further, an access point AP and a method therein for enabling access to a wireless tag in a wireless communications network are also provided.

20 Claims, 6 Drawing Sheets

(58) Field of Classification Search
CPC ........... G06K 7/10198; G06K 7/10227; G06K 7/10475; H04W 4/38; H04W 4/80
USPC ........................................................ 340/10.1
See application file for complete search history.

(56) References Cited

U.S. PATENT DOCUMENTS

| | | | |
|---|---|---|---|
| 8,717,144 B2* | 5/2014 | Kawaguchi | H04Q 9/00 340/10.1 |
| 2004/0150510 A1* | 8/2004 | Taki | G06K 7/0008 340/10.1 |
| 2005/0099269 A1* | 5/2005 | Diorio | G06K 19/0723 340/10.51 |
| 2006/0006986 A1 | 1/2006 | Gravelle et al. | |
| 2006/0022801 A1* | 2/2006 | Husak | G06K 17/0029 340/10.5 |
| 2007/0046467 A1* | 3/2007 | Chakraborty | H04B 1/22 340/572.1 |
| 2010/0164690 A1* | 7/2010 | Raphaeli | G06K 7/10019 340/10.2 |
| 2013/0147609 A1* | 6/2013 | Griffin | G06K 7/10356 340/10.5 |
| 2015/0091706 A1 | 4/2015 | Chemishkian et al. | |
| 2016/0365890 A1 | 12/2016 | Reynolds et al. | |
| 2017/0373892 A1 | 12/2017 | Ganesan et al. | |

OTHER PUBLICATIONS

Kellogg, Bryce et al., "Passive Wi-Fi: Bringing Low Power to Wi-Fi Transmissions", 14 pages.
Ensforth, Joshua F. et al., "Every Smart Phone is a Backscatter Reader: Modulated Backscatter Compatibility with Bluetooth 4.0 Low Energy (BLE) Devices", IEEE International Conference on RFID (RFID), 2015, Seattle, WA, pp. 78-85.
Thomas, Stewart J. et al., "Quadrature Amplitude Modulated Backscatter in Passive and Semipassive UHF RFID Systems" IEEE Transactions on Microwave Theory and Techniques, Apr. 4, 2012, vol. 60, No. 4, pp. 1175-1182.
Kimionis John et. al, "Enhancement of RF Tag Backscatter Efficiency With Low-Power Reflection Amplifiers", IEEE Transactions on Microwave Theory and Techniques, Dec. 2, 2014, vol. 62, No. 12, pp. 3562-3571.
Extended European Search Report for European Patent Application No. 18924964.2 dated Jan. 7, 2022, 13 pages.
Vougioukas, Georgios et al., "Could Battery-less Scatter Radio Tags Achieve 270-Meter Range?", School of ECE, Technical University of Crete, Chania, GR-73100, Greece, May 5, 2016, XP032916229, 3 pages.

* cited by examiner

NETWORK CONTROL ENTITY, AN ACCESS POINT AND METHODS THEREIN FOR ENABLING ACCESS TO WIRELESS TAGS IN A WIRELESS COMMUNICATIONS NETWORK

CROSS-REFERENCE TO RELATED APPLICATIONS

This application is a 35 U.S.C. § 371 national stage application for International Application No. PCT/SE2018/050692, entitled "A NETWORK CONTROL ENTITY, AN ACCESS POINT AND METHODS THEREIN FOR ENABLING ACCESS TO WIRELESS TAGS IN A WIRELESS COMMUNICATIONS NETWORK", filed on Jun. 27, 2018, the disclosures and contents of which are hereby incorporated by reference in their entireties.

TECHNICAL FIELD

Embodiments herein relate to wireless tags in a wireless communications network. In particular, embodiments herein relate to a network control entity and method therein for enabling access to wireless tags in a wireless communications network. Also, embodiments herein relate to an access point and method therein for enabling access to wireless tags in a wireless communications network.

BACKGROUND

One example of a wireless tag or label technology is Radio Frequency Identification (RFID). Normally, RFID uses electromagnetic fields emitted from a RFID reader to automatically identify and track wireless RFID tags.

Figure 1:
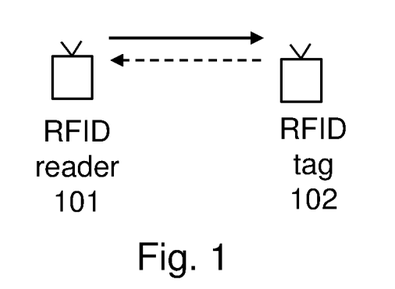
FIG. 1 is a schematic illustration of a RFID radio communication.

FIG. 1 shows an example of an RFID reader or interrogator 101, e.g. a two-way radio transmitter-receiver, sending a signal to a wireless tag 101 and reading its response. The response may confer electronically-stored information in the wireless tag 101, such as, e.g. information about an object onto which it is attached. There are basically three types of wireless RFID tags: active RFID tags, semi-active RFID tags, and passive RFID tags. Active RFID tags comprise a local power source, such as, e.g. a battery, and may periodically transmits its ID signal. Active RFIDs tag may operate hundreds of meters from the RFID reader. Semi-passive RFID tags, or Battery-Assisted Passive (BAP) tags, comprise a relatively small battery, and is activated when in the presence of an RFID reader. Passive RFID tags do not comprise a battery, but instead collects radio energy from a nearby RFID reader's interrogating radio waves. The collected radio energy is then used to modulate the interrogating radio waves into a response on the same frequency. Since it has no battery, passive RFID tags are normally cheaper and smaller than active or semi-active RFID tags.

Passive RFID tags may comprise at least three parts: an integrated circuit for storing and processing information that modulates and demodulates a radio-frequency (RF) signal; a means of collecting DC power from the incident RFID reader's radio signal; and an antenna for receiving and transmitting the radio signal. The passive RFID tag may also comprise either fixed or programmable logic for processing the transmission and sensor data, respectively.

Another example of a wireless tag or label technology is backscattering. While RFID is mono-static radio communication, i.e. the RFID reader both transmits and receives the signal from the wireless RFID tag, backscattering may use bi-static radio communication. Bi-static radio communication means that an emitter may be used to transmit a radio signal to the wireless tag, while another device, i.e. a receiver or reader, receives the response from the wireless tag. Thus, the receiver and the emitter may be two different devices that may be positioned at different locations. Similar to RFID, backscattering wireless tags may also be either active, semi-passive, or passive.

Figure 2:
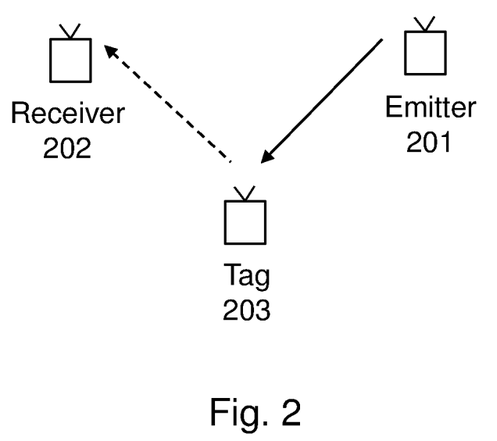
FIG. 2 is a schematic illustration of a backscattering radio communication.

FIG. 2 shows an example of an emitter 201, e.g. a RF signal generator, transmitting a radio signal to a wireless tag 202, and a receiver 203 receiving the backscattered response signal from the wireless tag 202. The backscattered response signal is generated by the wireless tag 202 by modulating its information onto its reflection coefficient of the transmitted radio signal. Due to their low cost and energy consumption, passive and/or semi-passive backscattering wireless tags are looking promising for Internet-of-Things (IoT) enabled device. However, one problem is how to enable such wireless tags to operate in wireless communications networks.

SUMMARY

It is an object of embodiments herein to enable wireless tags to operate in a wireless communications network.

According to a first aspect of embodiments herein, the object is achieved by a method performed by a network control entity for enabling access to at least one wireless tag in a wireless communications network. The wireless communications network comprise two or more access points, APs. The network control entity configures at least one first AP to transmit a radio frequency signal in a first time period. Also, the network control entity configures at least one second AP to receive, in the first time period, at least one radio signal reflected from the at least one wireless tag using the transmitted radio frequency signal.

According to a second aspect of embodiments herein, the object is achieved by a network control entity for enabling access to at least one wireless tag in a wireless communications network. The wireless communications network comprise two or more access points, APs. The network control entity is adapted to configure at least one first AP to transmit a radio frequency signal in a first time period. The network control entity is also adapted to configure at least one second AP to receive, in the first time period, at least one radio signal reflected from the at least one wireless tag using the transmitted radio frequency signal.

According to a third aspect of embodiments herein, the object is achieved by a method performed by an access point, AP, for enabling access to at least one wireless tag in a wireless communications network. The AP obtains configuration information. Also, the AP, based on the obtained configuration information, transmits a radio frequency signal in a first time period or receives, in the first time period, at least one radio signal reflected from at least one wireless tag using the transmitted radio frequency signal.

According to a fourth aspect of embodiments herein, the object is achieved by an access point, AP, for enabling access to at least one wireless tag in a wireless communications network. The AP is adapted to obtain configuration information. Based on the obtained configuration information, the AP is adapted to transmit a radio frequency signal in a first time period, or receive, in the first time period, at least one radio signal reflected from at least one wireless tag using the transmitted radio frequency signal.

According to a fifth aspect of the embodiments herein, a computer program is also provided that is configured to perform the method described above. Further, according to a sixth aspect of the embodiments herein, carriers are also provided that are configured to carry the computer program configured for performing the method described above.

By configuring at least one AP in a wireless communications network to transmit a radio frequency signal in a specified time period and at least one other AP in the wireless communications network to receive the reflected responses from wireless tags during the same specified time period, multi-static backscattering radio communication is enabled in the wireless communication network. In particular, it enables scheduling and multiplexing of wireless tags in the wireless communications network. Thus, the multi-static backscattering radio communication may here refer to the ability to provide multiple access to wireless tags in the wireless communications network and interoperability of wireless tags with other wireless nodes in a wireless communications network. Hence, wireless tags are enabled to operate in a wireless communications network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 3:
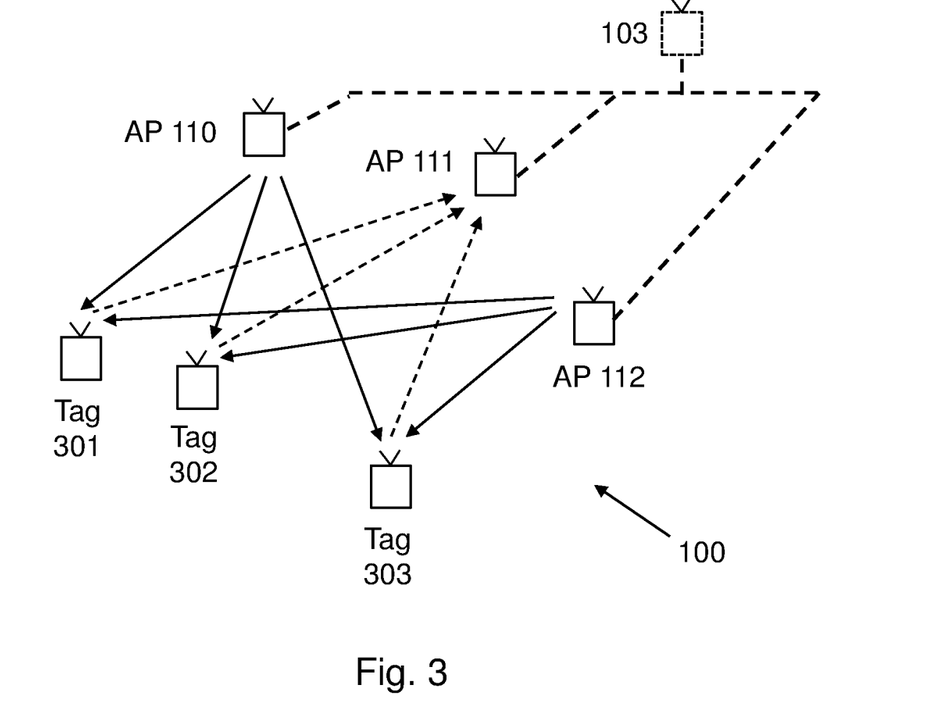
FIG. 3 is a schematic illustration of wireless tags in a wireless communications network according to some embodiments.

FIG. 3 depicts an example of a wireless communication network 100 in which embodiments herein may be implemented. The wireless communication network 100 may be any wireless system or cellular network, such as a Long Term Evolution (LTE) network, any $3^{rd}$ Generation Partnership Project (3GPP) cellular network, Worldwide interoperability for Microwave Access (Wimax) network, Wireless Local Area Network (WLAN/Wi-Fi), a Fourth Generation (4G) or LTE advanced network, a Fifth Generation (5G) or New Radio (NR) network etc.

The wireless communication network 100 may comprise a plurality of access points, APs, whereof three, a AP 110, a AP 111 and a AP 112, are depicted in the example of FIG. 3. The APs 110, 111, 112 may be operative or adapted to serve wireless devices located within their radio coverage. The APs 110, 111, 112 may be referred to as network nodes, network access nodes, radio nodes or base stations, and may, for example, be any one of eNBs, gNBs, an eNodeBs, gNodeBs, Home NodeBs, Home eNodeBs, or Home gNodeBs, etc. The APs 110, 111, 112 may also be any type of local access points, such as, access points for WiFi or WLAN. Further, it should also be noted that the APs 110, 111, 112 may also adapted to implement other known radio communications technologies, such as, e.g. Bluetooth, Multefire, Zigbee, etc. According to some embodiments, some of the APs 110, 111, 112 may be configured to transmit a radio frequency signal in the wireless communication network 100. This is denoted by the fully-drawn arrows in FIG. 3.

A plurality of wireless tags may operate in the wireless communication network 100, whereof three, a wireless tag 301, a wireless tag 302 and a wireless tag 303 are depicted in FIG. 3. The wireless tags 301, 302, 303 may be any type of reflective or backscattering enabled wireless tags, wherein the wireless tags are preferably passive and/or semi-passive wireless tags. It should also be noted that the wireless tags 301, 302, 303 may also be implemented as part of any type of wireless device or IoT enabled device, such as, e.g. IoT sensor, IoT wearable, or other IoT equipment, etc. Further, the wireless device may here refer to any type of wireless device or user equipment (UE) communicating with a network node and/or with another wireless device in a cellular, mobile or radio communication network or system. Examples of such wireless devices are mobile phones, cellular phones, Personal Digital Assistants (PDAs), smart phones, tablets, sensors equipped with a UE, Laptop Mounted Equipments (LME) (e.g. USB), Laptop Embedded Equipments (LEEs), Machine Type Communication (MTC) devices, or Machine to Machine (M2M) devices, Customer Premises Equipment (CPE), device-to-device (D2D) wireless devices, wireless devices capable of machine to machine (M2M) communication, etc. As shown in FIG. 3, the wireless tags 301, 302, 303 may be configured to receive the radio frequency signals from the APs 110, 111, 112. The wireless tags 301, 302, 303 may also respond to the transmitted radio frequency signals by reflecting, i.e. backscattering, the radio frequency signal to the APs 110, 111, 112. This is denoted by the dashed arrows in FIG. 3. According to some embodiments, the some of the APs 110, 111, 112 may be configured to receive at least one radio signal reflected, i.e. backscattered, from the wireless tags 301, 302, 303.

Furthermore, according to some embodiments, the wireless communication network 100 may also comprise a network control entity 103. The network control entity 103 may be operative to or adapted to communicate with and configure the APs 110, 111, 112. The network control entity 103 may also be co-located with, comprised in or form part of one or more of the APs 110, 111, 112 in the wireless communication network 100. Optionally, the network control entity 103 may also be provided as a service by a remote data processing network (not shown).

Although embodiments below are described with reference to FIG. 3, this should not be construed as limiting to the embodiments herein, but merely as an example made for illustrative purposes.

As part of the developing of the embodiments described herein, it has been realized that, in addition to modulating its information on the reflected or backscattered radio signal from a received radio frequency signal, some wireless tags are also be able to shift the center of frequency of the reflected radio signal away from the center of frequency of received radio frequency signal. This is particularly true for cheap and low complexity wireless tags, such as, e.g. passive and semi-passive wireless backscattering tags, since these wireless tags will normally perform the signal modulation of the received radio frequency signal directly at passband.

Figure 4:
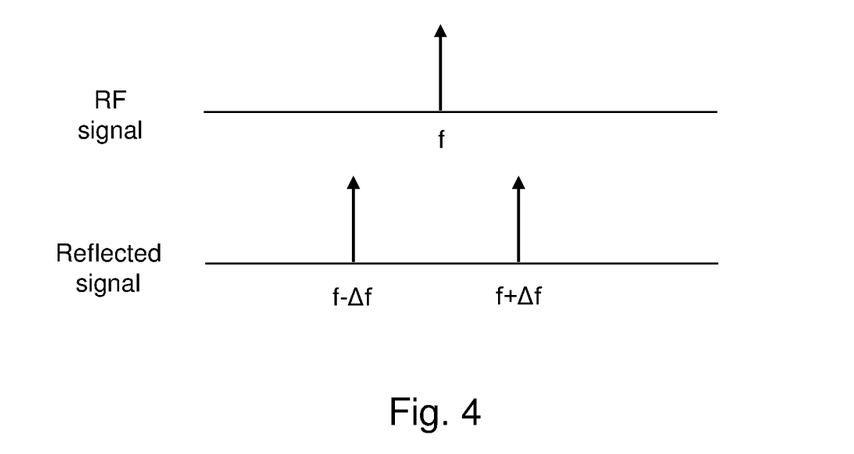
FIG. 4 is a schematic illustration the effect of frequency shifts of a reflected signal according to some embodiments.

FIG. 4 illustrates an example of the effect of signal modulation directly at passband of the received radio frequency, RF, signal. As shown in FIG. 4, the RF signal has a center of frequency, f. Since a wireless tag may shift the center of frequency of the reflected radio signal by an specific amount, $\Delta f$, the reflected radio signal of the wireless tag may thus comprise two reflection coefficients or reflected images, i.e. $f-\Delta f$ and $f+\Delta f$.

Hence, in accordance with embodiments herein, by configuring at least one AP in a wireless communications network to transmit a radio frequency signal in a specified time period and at least one other AP in the wireless communications network to receive the reflected responses from wireless tags during the same specified time period, this characteristic of wireless tags may be utilized to provide multiple access to the wireless tags in a wireless communications network. Embodiments of a network control entity, an AP and methods therein will be described in more detail below with reference to FIGS. 5-10 which utilize this fact.

Example of embodiments of a method performed by a network control entity 103 for enabling access to at least one wireless tag 301, 302, 303 in a wireless communications network 100 will now be described with reference to the flowchart depicted in FIG. 5. The wireless communications network 100 comprise two or more access points, APs 110, 111, 112. In some embodiments, the network control entity 103 may be comprised in, or form a part of, one of the APs 110, 111, 112 or be a separate network unit 103 in the wireless communications network 100. Optionally, the network control entity 103 may also be provided as a service by a remote data processing network. In some embodiments, the at least one wireless tag 301, 302, 303 may be semi-passive or passive devices that are powered by a transmitted radio frequency signal. This means, for example, that the at least one wireless tag 301, 302, 30 may be semi-passive or passive wireless tags implemented as part of any type of IoT enabled device or wireless device, wherein the IoT enabled device or wireless device are also powered by the transmitted radio frequency signal.

Figure 5:
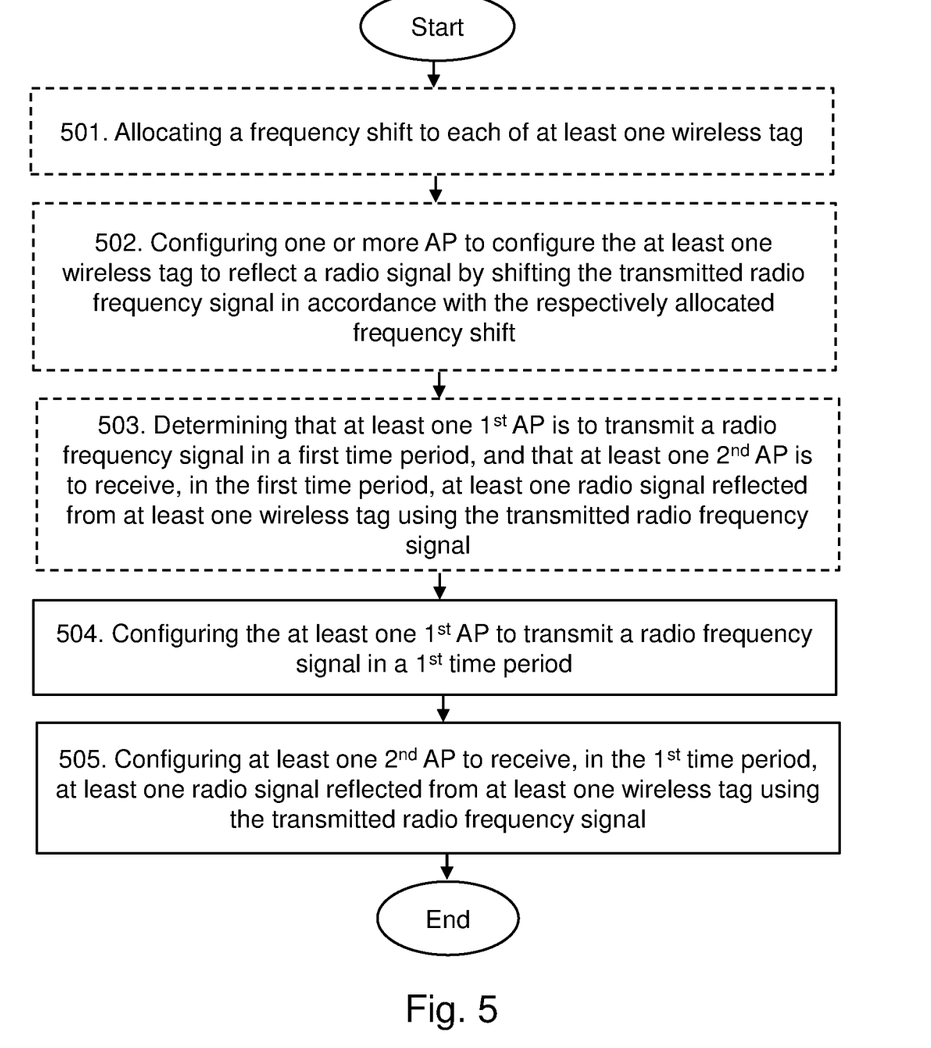
FIG. 5 is a flowchart depicting embodiments of a method in a network control entity.

FIG. 5 is an illustrated example of actions or operations which may be taken by the network control entity 103 in the wireless communication network 100.

Action 501

Optionally, the network control entity 103 may allocate a frequency shift to each of the at least one wireless tag 301, 302, 303, respectively. The allocated frequency shift is to be used by the at least one wireless tag 301, 302, 303 when reflecting a radio signal using the transmitted radio frequency signal. This means that the network control entity 103 may allocate a unique frequency shift, $\Delta f_n$, to each of the wireless tags 301, 302, 303 in the wireless communications network 100. Here, n=1, 2, ..., N, wherein N may be the total number of wireless tags that may be allocated a frequency shift within a determined total frequency bandwidth, e.g. $\Delta F$ in FIG. 8. The determined total frequency bandwidth may be the radio or frequency resources available or allocated for wireless tags in the wireless communications network 100. For example, in the wireless communications network 100 shown in FIG. 3, this means that the wireless tag 301 may be allocated a frequency shift, e.g. $\Delta f_1$ in FIG. 8, the wireless tag 302 may be allocated a frequency shift, e.g. $\Delta f_2$ in FIG. 8, and the wireless tag 303 may be allocated a frequency shift, e.g. $\Delta f_3$ in FIG. 8. The allocation of frequency shifts, e.g. $\Delta f_n$, to each of the wireless tags 301, 302, 303 may be performed statically, semi-statically, or dynamically by the network control entity 103.

The network control entity 103 may also inform each of the APs 110, 111, 112 of the frequency shift allocation of each of the at least one wireless tag 301, 302, 303. In this case, this also means that each of the APs 110, 111, 112 may be informed about the radio or frequency resources that will be used by each of the at least one wireless tag 301, 302, 303 when reflecting, i.e. backscattering, a radio signal using the transmitted radio frequency signal in the wireless communications network 100.

Action 502

After the allocation in Action 501, the network control entity 103 may configure one or more of the APs 110, 111, 112 to configure the at least one wireless tag 301, 302, 303 to reflect a radio signal by shifting the transmitted radio frequency signal in accordance with the respectively allocated frequency shift. This means that the network control entity 103 may configure one or more of the APs 110, 111, 112, to transmit information to one or more of the at least one wireless tag 301, 302, 303 indicating that the one or more at least one wireless tag 301, 302, 303 is to reflect a radio signal by shifting the transmitted radio frequency signal in accordance with its respectively allocated frequency shift, $\Delta f_n$. This information may comprise the respectively allocated frequency shift, $\Delta f_n$, of the one or more of the at least one wireless tag 301, 302, 303.

Action 503

Optionally, the network control entity 103 may determine that at least one first AP 110, 111, 112 is to transmit a radio frequency signal in a first time period, and that at least one second AP 110, 111, 112 is to receive, in the first time period, at least one radio signal reflected from at least one wireless tag 301, 302, 303 using the transmitted radio frequency signal. This means that the network control entity 103 may assign different APs 110, 111, 112 with different tasks, whereby some of the APs 110, 111, 112 may be assigned to transmit a radio frequency signal and some of the APs 110, 111, 112 may be assigned to receive at least one radio signal reflected, i.e. backscattered, by the at least one wireless tag 301, 302, 303.

In some embodiments, the network control entity 103 may group each of the at least one first AP 110, 111, 112 in a transmitting, TX, group. Each of at least one first AP 110, 111, 112 in the TX group may also synchronize their downlink, DL, time periods and transmit their radio frequency signals simultaneously. Also, the network control entity 103 may group each of the at least one second AP 110, 111, 112 in a receiving, RX, group. Each of the at least one second AP 110, 111, 112 in the RX group may also synchronize their uplink, UL, time periods and receive the reflected radio signals from the at least one wireless tag 301, 302, 303 simultaneously. This means that the network control entity 103 may coordinate and synchronize the transmissions of the radio frequency signals and receptions of the reflected radio signal of the APs 110, 111, 112 in the wireless communications network 100.

Action 504

The network control entity 103 configures at least one first AP 110, 111, 112 to transmit a radio frequency signal in a first time period. This means that the network control entity 103 may configure at least one first AP 110, 111, 112 to be a transmitter and to, simultaneously with the other the transmitting APs among the at least one first AP 110, 111, 112, transmit a radio frequency signal in a determined first time period. The radio frequency signals, transmitted from each of the at least one first AP 110, 111, 112 configured to transmit a radio frequency signal, are identical or at least significantly similar. The latter means that the radio frequency signal is transmitted on the same, or at least approximately the same, frequency or radio resources in the wireless communications network 100 from each of the at least one first AP. In some embodiments, this means that the radio frequency signals transmitted from each of the one or more APs 110, 111, 112 configured to transmit a radio frequency signal may be transmitted in the same determined DL time slot. This is further exemplified in FIGS. 7-8 below. In some embodiments, the transmitted radio signal may be a radio signal comprising no information, i.e. only used to power the wireless tags 301, 302, 303. Alternative, the transmitted radio signal may also comprise information to the wireless tags 301, 302, 303. In some embodiments, the transmitted radio frequency signal may be a modulated Radio Frequency, RF, carrier.

Figure 8:
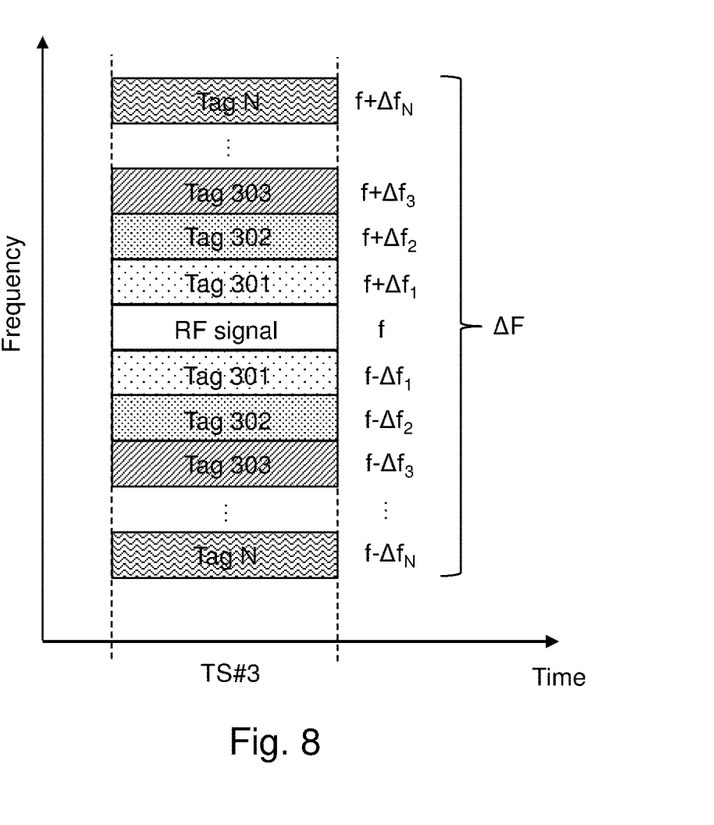
FIG. 8 is a schematic illustration of allocated frequencies in a first time period according to some embodiments.

In some embodiments, the network control entity 103 may configure the at least one first AP 110, 111, 112 to also refrain from transmitting, in the first time period, on the subsets of frequency resources allocated to the at least one wireless tag 301, 302, 303. This means that the network control entity 103 may configure the transmitting APs to remain silent during the first time period, i.e. not perform any transmissions during the first time period, on any frequency or radio resources outside of the frequency or radio resources used for transmitting the radio frequency signal, e.g. f. Optionally, in case a determined set of frequency resources, such as, e.g. $\Delta F$ in FIG. 8, is used for the allocation of the frequency resources to the at least one wireless tag 301, 302, 303, the network control entity 103 may configure the transmitting APs to remain silent during the first time period on any frequency or radio resources within the determined set of frequency resources that is outside of the frequency or radio resources used for transmitting the radio frequency signal, e.g. f in FIG. 8. This may be performed so as to not disturb or cause noise for the reception of the reflected radio signals in the subsets of frequency resources allocated to the at least one wireless tag 301, 302, 303 at the receiving APs in the wireless communications network 100.

In some embodiments, the network control entity 103 may configure the at least one first AP 110, 111, 112 to transmit, in a second time period preceding the first time period, a scheduling grant to the at least one wireless tag 301, 302, 303 indicating that the transmitted radio frequency signal is to be expected in the first time period. This means that the network control entity 103 may configure the transmitting APs to prepare and schedule some or all of the at least one wireless tags 301, 302, 303 to receive the transmitted radio frequency signal in the first determined time period.

Action 505

The network control entity 103 configures at least one second AP 110, 111, 112 to receive, in the first time period, at least one radio signal reflected from the at least one wireless tag 301, 302, 303 using the transmitted radio frequency signal. This means that the network control entity 103 may configure one or more of the APs 110, 111, 112, to be a receiver and to, simultaneously along with other receivers among the one or more APs 110, 111, 112, receive, in the determined first time period, at least one radio signal reflected, i.e. backscattered, from the at least one wireless tag 301, 302, 303 using the transmitted radio frequency signal.

In some embodiments, the network control entity 103 may configure the at least one second AP 110, 111, 112 to allocate two subsets of frequency resources, within a determined set of frequency resources to the at least one wireless tag 301, 302, 303 in the first time period. This means that the network control entity 103 may configure receiving APs to receive the reflected, i.e. backscattered, radio signal from the at least one wireless tag 301, 302, 303 in each of their respectively allocated two subsets of frequency resources, i.e. pairs of RF sub-channels, e.g. $f-\Delta f_n$, and $f+\Delta f_n$. It should also be noted that, optionally, the network control entity 103 may configure the receiving APs to use only one of the respectively allocated two subsets of frequency resources for receiving the reflected, i.e. backscattered, radio signal from the at least one wireless tag 301, 302, 303. Accordingly, in some embodiments, the network control entity 103 may also configure the at least one second AP 110, 111, 112 to receive, in the first time period, the at least one radio signal reflected from the at least one wireless tag 301, 302, 303 in at least one of the allocated two subsets of frequency resources.

Figure 6:
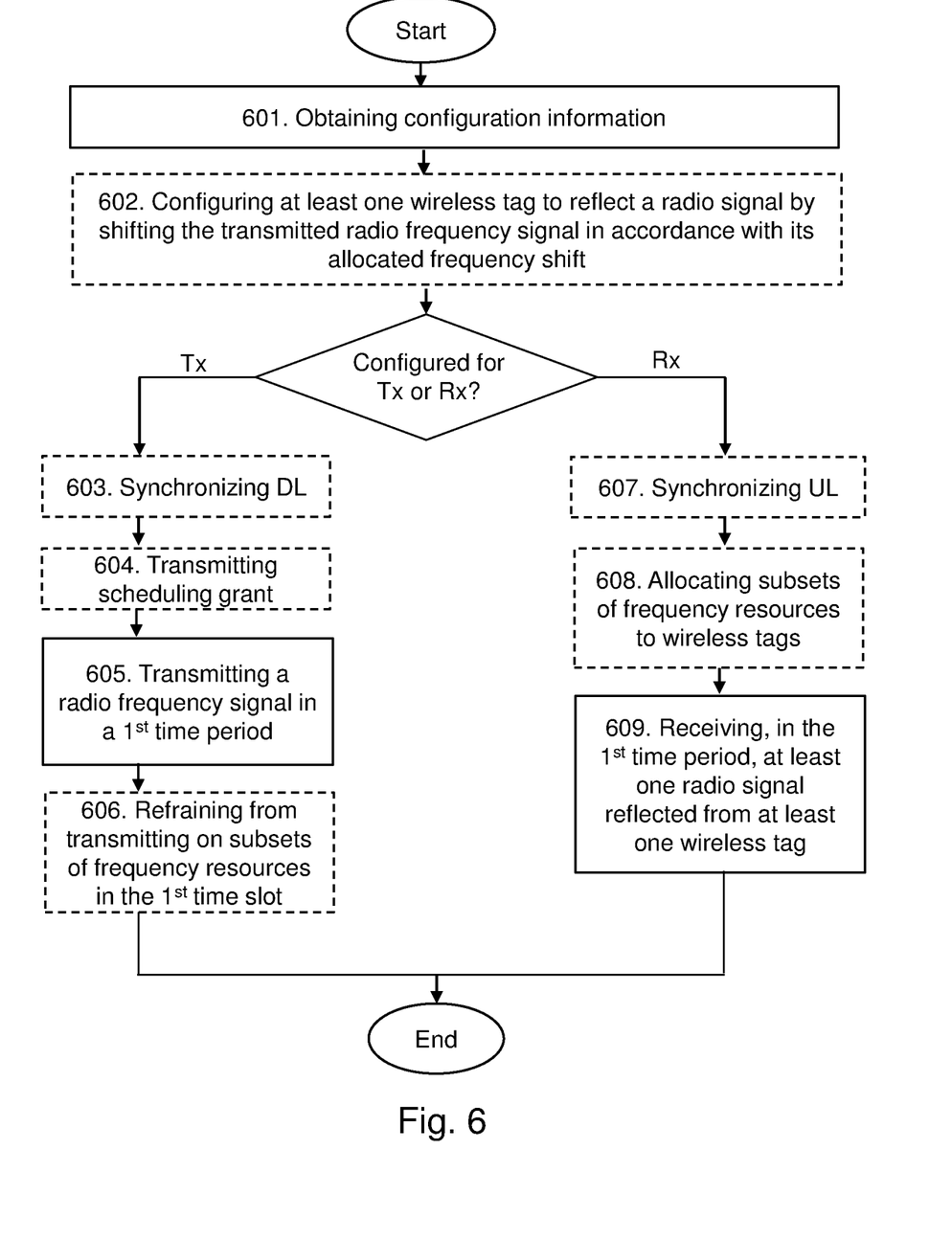
FIG. 6 is a flowchart depicting embodiments of a method in an AP.

Example of embodiments of a method performed by an access point, AP 110, 111, 112, for enabling access to at least one wireless tag 301, 302, 303 in a wireless communications network 100 will now be described with reference to the flowchart depicted in FIG. 6. FIG. 6 is an illustrated example of actions or operations which may be taken by one or more of the access points, APs 110, 111, 112, in the wireless communication network 100.

Action 601

The AP 110, 111, 112 obtains configuration information. This means that the actions or operations of the AP 110, 111, 112, may be controlled by a network control entity 103, since the configuration information may be transmitted to the AP 110, 111, 112 from the network control entity 103. Optionally, the configuration information may be information already present in the AP 110, 111, 112, such as, e.g. a parameter preconfigured in the AP 110, 111, 112. In this case, it is not necessary for the AP 110, 111, 112 to receive any configuration information from the network control entity 103 in order to control or adapt the function of the AP 110, 111, 112, since this is already determined in the AP 110, 111, 112.

In some embodiments, the obtained configuration information may indicate that the AP 110, 111, 112 is to transmit a radio frequency signal in a first time period, or that the AP 110, 111, 112 is to receive, in the first time period, at least one radio signal reflected from at least one wireless tag 301, 302, 303 using the transmitted radio frequency signal. This means that the AP 110, 111, 112 may either be configured, by the network control entity 101, 110, 111, 112, to operate as a transmitter or as a receiver in the wireless communications network 100 during the first time period. In some embodiments, the obtained configuration information may further indicate that the AP 110, 111, 112 is to configure at least one wireless tag 301, 302, 303 to reflect a radio signal by shifting the transmitted radio frequency signal in accordance with a respectively allocated frequency shift, e.g. $\Delta f_n$. This information may comprise the respectively allocated frequency shift, e.g. $\Delta f_n$, of the at least one wireless tag 301, 302, 303, e.g. if this is not already known by the AP 110, 111, 112.

Action 602

After obtaining the configuration information in Action 601, the AP 110, 111, 112 may configure at least one wireless tag 301, 302, 303 to reflect a radio signal by shifting the transmitted radio frequency signal in accordance with a respectively allocated frequency shift. This means that the AP 110, 111, 112, may transmit information to one or more of the at least one wireless tag 301, 302, 303 indicating that the one or more at least one wireless tag 301, 302, 303 is to reflect a radio signal by shifting the transmitted radio frequency signal in accordance with its respectively allocated frequency shift, e.g. $\Delta f_n$. This information may comprise the respectively allocated frequency shift, e.g. $\Delta f_n$, of the at least one wireless tag 301, 302, 303, e.g. if this is not already known by the at least one wireless tag 301, 302, 303. This may be performed in response to the obtained configuration information in Action 601.

Action 603

Optionally, when the AP 110, 111, 112 is to transmit a radio frequency signal in the first time period, the AP 110, 111, 112 may synchronize its downlink, DL, time periods with one or more APs 110, 111, 112 in the wireless communications network 100 also configured to transmit a radio frequency signal in the first time period. This means, for example, that the transmitting APs 110, 111, 112 in the wireless communications network 100 may synchronize their DL time slots in order to ensure that they are able to transmit their radio frequency signals simultaneously.

Action 604

According to some embodiments, when the AP 110, 111, 112 is to transmit a radio frequency signal in the first time period, the AP 110, 111, 112 may transmit, in a second time period preceding the first time period, a scheduling grant to the at least one wireless tag 301, 302, 303 indicating that a radio frequency signal is to be expected in the first time period. Thus, the transmitting APs in the wireless communications network 100 may prepare and schedule some or all of the at least one wireless tags 301, 302, 303 to receive the transmitted radio frequency signal in the first time period.

Action 605

Based on the obtained configuration information in Action 601, the AP 110, 111, 112, may transmit a radio frequency signal in a first time period. This means that the AP 110, 111, 112, is configured via the obtained information to be a transmitter and to, simultaneously with the other transmitting APs among the one or more APs 110, 111, 112, transmit a radio frequency signal in the first time period.

Action 606

According to some embodiments, when the AP 110, 111, 112 is to transmit a radio frequency signal in the first time period, the AP 110, 111, 112 may refrain from transmitting, in the first time period, on subsets of frequency resources allocated to the at least one wireless tag 301, 302, 303. This may be performed so as to not disturb or cause noise for the reception of the reflected radio signals in the subsets of frequency resources, e.g. $f-\Delta f_n$, and $f+\Delta f_n$, allocated to the at least one wireless tag 301, 302, 303 at the receiving APs in the wireless communications network 100.

Action 607

In some embodiments, when the AP 110, 111, 112 is to receive at least one reflected radio signal in the first time period, the AP 110, 111, 112 may synchronize its uplink, UL, time periods with one or more APs 110, 111, 112 in the wireless communications network 100 also configured to receive at least one reflected radio signal in the first time period. This means, for example, that the receiving APs 110, 111, 112 in the wireless communications network 100 may synchronize their UL time slots in order to ensure that they are able to receive at least one reflected radio signal in the first time period.

Action 608

In some embodiments, when the AP 110, 111, 112 is to receive at least one reflected radio signal in the first time period, the AP 110, 111, 112 may allocate two subsets of frequency resources within a determined set of frequency resources to the at least one wireless tag 301, 302, 303 in the first time period. This means that the AP 110, 111, 112 may receive the reflected, i.e. backscattered, radio signal from the at least one wireless tag 301, 302, 303 in each of their respectively allocated two subsets of frequency resources, e.g. $f-\Delta f_n$, and $f+\Delta f_n$. It should also be noted that, optionally, the AP 110, 111, 112 may use only one of the respectively allocated two subsets of frequency resources for receiving the reflected, i.e. backscattered, radio signal from the at least one wireless tag 301, 302, 303. Accordingly, in some embodiments, the AP 110, 111, 112 may receive, in the first time period, the at least one radio signal reflected from the at least one wireless tag 301, 302, 303 in at least one of the allocated two subsets of frequency resources.

Action 609

Based on the obtained configuration information in Action 601, the AP 110, 111, 112, may receive, in the first time period, at least one radio signal reflected from at least one wireless tag 301, 302, 303 using the transmitted radio frequency signal. This means that the AP 110, 111, 112, may be configured via the obtained information to be a receiver and to, simultaneously with the other receiving APs among the one or more APs 110, 111, 112, receive, in the determined first time period, at least one radio signal reflected, i.e. backscattered, from the at least one wireless tag 301, 302, 303 using the transmitted radio frequency signal.

It should also be noted that the receiving APs in the wireless communications network 100, e.g. all APs in an RX group, may interchange information regarding their received at least one radio signals. This may be performed in order to increase the detection performance of the radio signals in the wireless communications network 100. According to some embodiments, this may be performed using so-called chase combining of the received radio signals. Optionally, this may be performed by the network control entity 103. In this case, the received radio signals in each or some of the receiving APs in the wireless communications network 100 may be sent to the network control entity 103 for detection.

Figure 7:
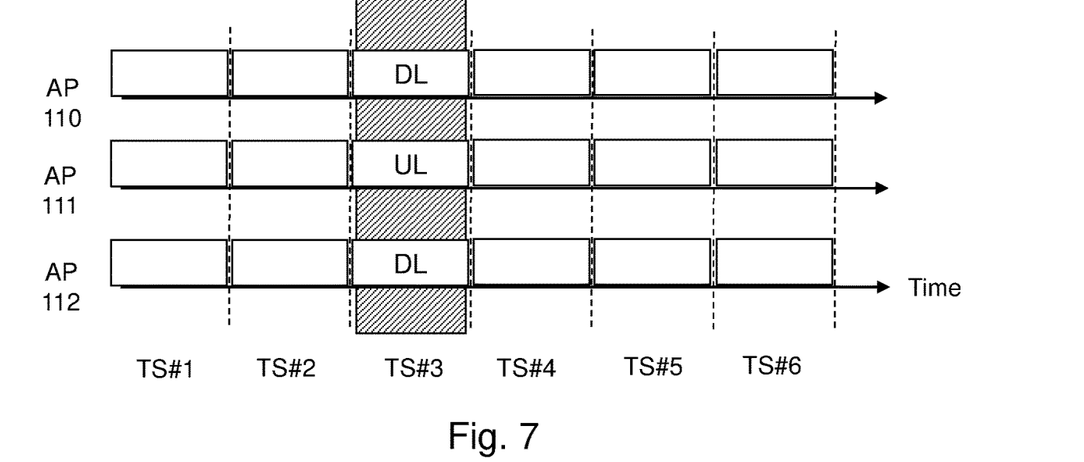
FIG. 7 is a schematic illustration of an example of a UL/DL configuration of APs in according to some embodiments.

FIG. 7 shows a schematic illustration of an example of a UL/DL configuration of APs 110, 111, 112 according to some embodiments. In this example, the AP 110 and AP 112 are configured to transmit a radio frequency signal on the downlink in time slot TS #3. During the same time period, i.e. in time slot TS #3, the AP 111 is configured to receive receive at least one radio signal reflected, i.e. backscattered, from the at least one wireless tag 301, 302, 303. The at least one radio signal being reflected by the at least one wireless tag 301, 302, 303 using the transmitted radio frequency signal. This means that the wireless tag 301, 302, 303 may use the energy of the transmitted radio frequency signals from the AP 110 and AP 112 to generate the radio signal that is reflected from the wireless tag 301, 302, 303 to be received by the AP 111 within the same time slot TS #3. Optionally, in an earlier time slot TS #1 or TS #2, i.e. a time slot which precedes the time slot TS #3, the AP 110 and AP 112 may be configured to transmit a scheduling grant to the at least one wireless tag 301, 302, 303 indicating that a radio frequency signal is to be expected in the time slot TS #3.

FIG. 8 shows a schematic illustration of radio resource allocation, i.e. allocated frequencies, in a first time period, such as, e.g. time slot TS #3 in FIG. 7, according to some embodiments. According to this example, all transmitting APs in the wireless communications network 100, such as, e.g. the AP 110 and the AP 112 in FIG. 7, are configured to simultaneously transmit a radio frequency signal on the radio or frequency resource fin time slot TS #3.

During the same time period, i.e. in time slot TS #3, all receiving APs in the wireless communications network 100, such as, e.g. the AP 111 in FIG. 7, are configured to receive radio signals reflected, i.e. backscattered, from the wireless tag 301, 302, 303 in the wireless communications network 100 in their respective allocated radio or frequency resources, i.e. $f-\Delta f_n$ and $f+\Delta f_n$. For example, in all receiving APs in the wireless communications network 100, such as, e.g. the AP 111 in FIG. 7, the wireless tag 301 may be allocated the radio or frequency resources, $f-\Delta f_1$ and $f+\Delta f_1$, while the wireless tag 302 may be allocated the radio or frequency resources, $f-\Delta f_2$ and $f+\Delta f_2$, and the wireless tag 303 may be allocated the radio or frequency resources, $f-\Delta f_3$ and $f+\Delta f_3$. This means that since the wireless tags 301, 302, 303 will perform a frequency shift of the transmitted radio signal fin accordance with its allocated frequency shift $\Delta f_1$, $\Delta f_2$ and $\Delta f_3$, respectively, and modulate its information onto the reflected radio signals, the receiving APs in the wireless communications network 100, such as, e.g. the AP 111 in FIG. 7, are adapted to receive the reflected signal from each of the wireless tags 301, 302, 303 in their respectively allocated radio or frequency resources $f-\Delta f_1$ and $f+\Delta f_1$, $f-\Delta f_2$ and $f+\Delta f_2$, and $f-\Delta f_3$ and $f+\Delta f_3$. This example may be extended for any number of wireless tags within the determined set of frequency resources $\Delta F$ allocated to the wireless tags in the wireless communication network 100.

According to some embodiments, the allocated radio or frequency resources $f-\Delta f_1$ and $f+\Delta f_1$, $f-\Delta f_2$ and $f+\Delta f_2$, and $f-\Delta f_3$ and $f+\Delta f_3$, to the wireless tags 301, 302, 303 are non-overlapping.

Figure 9:
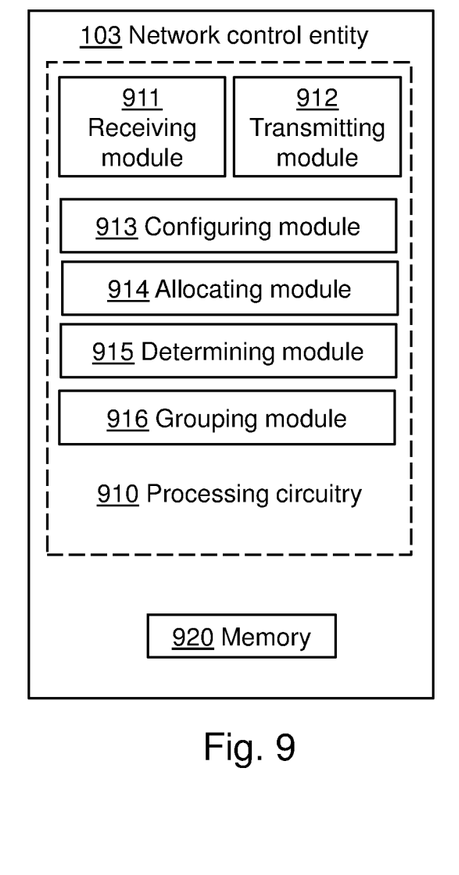
FIG. 9 is a block diagram depicting embodiments of a network control entity.

To perform the method actions in a network control entity 103 for enabling access to at least one wireless tag 301, 302, 303 in a wireless communications network 100, wherein the wireless communications network 100 comprise two or more access points, APs 110, 111, 112, the network control entity 103 may comprise the following arrangement depicted in FIG. 9. FIG. 9 shows a schematic block diagram of embodiments of a network control entity 103 as a separate unit adapted to be connected to the wireless communications network 100. However, it should also be noted that the network control entity 103 may also be comprised in, or form a part of, one or more of the APs 110, 111, 112. Alternatively, the network control entity 103 may be provided as a service by a remote data processing network.

The network control entity 103 may comprise processing circuitry 910 and a memory 920. It should be noted that some or all of the functionality described in the embodiments above as being performed by the network control entity 103 may be provided by the processing circuitry 910 executing instructions stored on a computer-readable medium, such as, e.g. the memory 9 shown in FIG. 9. The processing circuitry 910 may also comprise a receiving module 911 and a transmitting module 912. The receiving module 911 and the transmitting module 912 may also form part of a single transceiver. The receiving module 911 and the transmitting module 912 may be adapted to communicate with the two or more access points, APs 110, 111, 112, in the wireless communications network 100. Alternative embodiments of the network control entity 103 may comprise additional components, such as, for example, a configuring module 913, an allocating module 914, a determining module 915, and a grouping module 916, each responsible for providing its respective functionality necessary to support the embodiments described herein.

The network control entity 103 or processing circuitry 910 is adapted to, or may comprise the configuring module 913 adapted to, configure at least one first AP 110, 111, 112 to transmit a radio frequency signal in a first time period. Also, the network control entity 103 or processing circuitry 910 is adapted to, or may comprise the configuring module 913 adapted to, configure at least one second AP 110, 111, 112 to receive, in the first time period, at least one radio signal reflected from the at least one wireless tag 301, 302, 303 using the transmitted radio frequency signal.

In some embodiments, the network control entity 103 or processing circuitry 910 may be adapted to, or may comprise the configuring module 913 adapted to, configure the at least one second AP 110, 111, 112 to allocate two subsets of frequency resources, e.g. $f-\Delta f_n$ and $f+\Delta f_n$, within a determined set of frequency resources, e.g. $\Delta F$, to the at least one wireless tag 301, 302, 303 in the first time period. In this case, according to some embodiments, the network control entity 103 or processing circuitry 910 may be adapted to, or may comprise the configuring module 913 adapted to, configure the at least one second AP 110, 111, 112 to receive, in the first time period, the at least one radio signal reflected from the at least one wireless tag 301, 302, 303 in at least one of the allocated two subsets of frequency resources, e.g. $f-\Delta f_n$ and $f+\Delta f_n$. Also, in some embodiments, the network control entity 103 or processing circuitry 910 may be adapted to, or may comprise the configuring module 913 adapted to, configure the at least one first AP 110, 111, 112 to refrain from transmitting, in the first time period, on the subsets of frequency resources, e.g. $f-\Delta f_n$ and $f+\Delta f_n$, allocated to the at least one wireless tag 301, 302, 303. Furthermore, in some embodiments, the network control entity 103 or processing circuitry 910 may be adapted to, or may comprise the configuring module 913 adapted to, configure the at least one first AP 110, 111, 112 to transmit, in a second time period preceding the first time period, a scheduling grant to the at least one wireless tag 301, 302, 303 indicating that the transmitted radio frequency signal is to be expected in the first time period. Here, it should also be noted that the configuration by the network control entity 103 may be performed by transmitting configuration information to the two or more access points, APs 110, 111, 112, in the wireless communications network 100.

In some embodiments, the network control entity 103 or processing circuitry 910 may be adapted to, or may comprise the allocating module 914 adapted to, allocate a frequency shift, e.g. $\Delta f_n$, to the at least one wireless tag 301, 302, 303, wherein the allocated frequency shift, e.g. $\Delta f_n$, is to be used by the at least one wireless tag 301, 302, 303 when reflecting a radio signal using the transmitted radio frequency signal. Here, in some embodiments, the network control entity 103 or processing circuitry 910 may be adapted to, or may comprise the configuring module 913 adapted to, configure one or more of the at least one first and/or second AP 110, 111, 112 to configure the at least one wireless tag 301, 302, 303 to reflect a radio signal by shifting the transmitted radio frequency signal in accordance with a respectively allocated frequency shift, e.g. $\Delta f_n$.

Also, in some embodiments, the network control entity 103 or processing circuitry 910 may be adapted to, or may comprise the determining module 915 adapted to, determine that the at least one first AP 110, 111, 112 is to transmit a radio frequency signal in a first time period, and that at least one second AP 110, 111, 112 is to receive, in the first time period, at least one radio signal reflected from at least one wireless tag 301, 302, 303 using the transmitted radio frequency signal.

Furthermore, in some embodiments, the network control entity 103 or processing circuitry 910 may be adapted to, or may comprise the grouping module 916 adapted to, group each of at least one first AP 110, 111, 112 in a transmitting, TX, group, wherein each of at least one first AP 110, 111, 112 in the TX group synchronize their downlink, DL, time periods and transmit their radio frequency signals simultaneously. Also, the network control entity 103 or processing circuitry 910 may be adapted to, or may comprise the grouping module 916 adapted to, group each of the at least one second AP 110, 111, 112 in a receiving, RX, group, wherein each of the at least one second AP 110, 111, 112 in the RX group synchronize their uplink, UL, time periods and receive the reflected radio signals from the at least one wireless tag 301, 302, 303 simultaneously.

Furthermore, the embodiments for enabling access to at least one wireless tag 301, 302, 303 in a wireless communications network 100 described above may be implemented through one or more processing circuitries, such as, e.g. the processing circuitry 910 in the network control entity 103 depicted in FIG. 9, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 910 in the network control entity 103. The computer program code may e.g. be provided as pure program code in the network control entity 103 or on a server and downloaded to the network control entity 103. Thus, it should be noted that the modules of the network control entity 103 may in some embodiments be implemented as computer programs stored in memory, e.g. in the memory modules 920 in FIG. 9, for execution by processing circuitries or processing modules, e.g. the processing circuitry 910 of FIG. 9.

Those skilled in the art will also appreciate that the processing circuitry 910 and the memory 920 described above may refer to a combination of analog and digital circuits, and/or one or more processors configured with software and/or firmware, e.g. stored in a memory, that when executed by the one or more processors such as the processing circuitry 920 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 10:
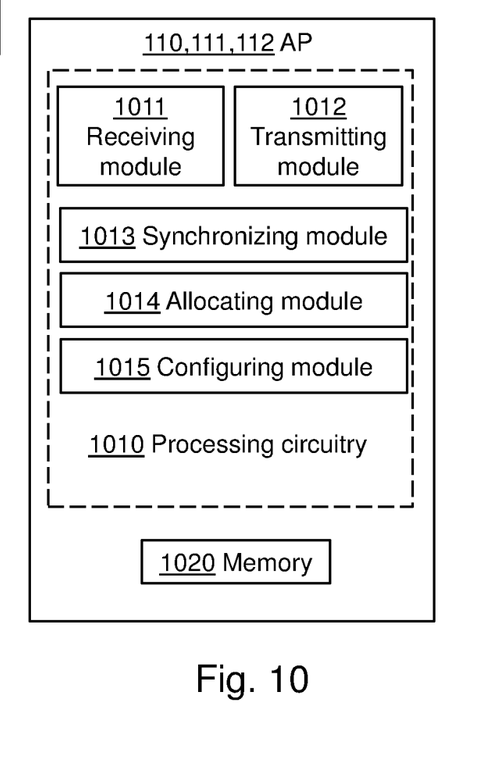
FIG. 10 is a block diagram depicting embodiments of an AP.

To perform the method actions in an access point, AP 110, 111, 112, for enabling access to at least one wireless tag 301, 302, 303 in a wireless communications network 100, the AP 110, 111, 112 may comprise the following arrangement depicted in FIG. 10. FIG. 10 shows a schematic block diagram of embodiments of a AP 110, 111, 112.

The AP 110, 111, 112 may comprise processing circuitry 1010, a memory 1020 and one or more antennas (not shown). It should also be noted that some or all of the functionality described in the embodiments above as being performed by the AP 110, 111, 112 may be provided by the processing circuitry 1010 executing instructions stored on a computer-readable medium, such as, e.g. the memory 1020 shown in FIG. 15. The AP 110, 111, 112 and/or the processing circuitry 1010 may also comprise a receiving module 1011 and a transmitting module 1012. The receiving module 1011 and the transmitting module 1012 may comprise Radio Frequency, RF, circuitry and baseband processing circuitry capable of transmitting and receiving radio signals in the wireless communications network 100. The receiving module 1011 and the transmitting module 1012 may also form part of a single transceiver. Further, the receiving module 1011 and the transmitting module 1012 may be adapted to communicate with a network control entity 103 and/or other access points, APs 110, 111, 112, in the wireless communications network 100, e.g. via a wired or fiber connection. Alternative embodiments of the AP 110, 111, 112 and/or the processing circuitry 1010 may comprise additional components, such as, for example, a synchronizing module 1013, an allocating module 1014, and a configuring module 1015, each responsible for providing its respective functionality necessary to support the embodiments described herein.

The AP 110, 111, 112 or processing circuitry 1010 is adapted to, or may comprise the receiving module 1011 adapted to, obtain configuration information. Also, the AP 110, 111, 112 or processing circuitry 1010 is adapted to, or may comprise the transmitting module 1012 and/or receiving module 1011 adapted to, based on the obtained configuration information, transmit a radio frequency signal in a first time period, or receive, in the first time period, at least one radio signal reflected from at least one wireless tag 301, 302, 303 using the transmitted radio frequency signal.

In some embodiments, the obtained configuration information may indicate that the AP 110, 111, 112 is to transmit a radio frequency signal in a first time period. Alternatively, the obtained configuration information may indicate that the AP 110, 111, 112 is to receive, in the first time period, at least one radio signal reflected from at least one wireless tag 301, 302, 303 using the transmitted radio frequency signal.

In some embodiments, when the AP 110, 111, 112 is to receive at least one reflected radio signal in the first time period, the AP 110, 111, 112 or processing circuitry 1010 may be adapted to, or may comprise the synchronizing module 1013 adapted to, synchronize its uplink, UL, time periods with one or more APs 110, 111, 112 in the wireless communications network 100 also configured to receive at least one reflected radio signal in the first time period. Furthermore, when the AP 110, 111, 112 is to receive at least one reflected radio signal in the first time period, the AP 110, 111, 112 or processing circuitry 1010 may be adapted to, or may comprise the allocating module 1014 adapted to, allocate two subsets of frequency resources, e.g. $f-\Delta f_n$ and $f+\Delta f_n$, within a determined set of frequency resources, e.g. $\Delta F$, to the at least one wireless tag 301, 302, 303 in the first time period. In this case, according to some embodiments, the AP 110, 111, 112 or processing circuitry 1010 may be adapted to, or may comprise the receiving module 1011 adapted to, receive, in the first time period, the at least one radio signal reflected from the at least one wireless tag 301, 302, 303 in at least one of the allocated two subsets of frequency resources, e.g. $f-\Delta f_n$ and $f+\Delta f_n$.

In some embodiments, when the AP 110, 111, 112 is to transmit a radio frequency signal in the first time period, the AP 110, 111, 112 or processing circuitry 1010 may be adapted to, or may comprise the synchronizing module 1013 adapted to, synchronize its downlink, DL, time periods with one or more APs 110, 111, 112 in the wireless communications network 100 also configured to transmit a radio frequency signal in the first time period. Furthermore, when the AP 110, 111, 112 is to transmit a radio frequency signal in a first time period, the AP 110, 111, 112 or processing circuitry 1010 may be adapted to, or may comprise the transmitting module 1012 adapted to, transmit, in a second time period preceding the first time period, a scheduling grant to the at least one wireless tag 301, 302, 303 indicating that a radio frequency signal is to be expected in the first time period. Also, when the AP 110, 111, 112 is to transmit a radio frequency signal in a first time period, the AP 110, 111, 112 or processing circuitry 1010 may be adapted to, or may comprise the transmitting module 1012 adapted to, refrain from transmitting, in the first time period, on subsets of frequency resources, e.g. $f-\Delta f_n$, and $f+\Delta f_n$, allocated to the at least one wireless tag 301, 302, 303.

In some embodiments, the AP 110, 111, 112 or processing circuitry 1010 may be adapted to, or may comprise the configuring module 1015 adapted to, configure the at least one wireless tag 301, 302, 303 to reflect a radio signal by shifting the transmitted radio frequency signal in accordance with a respectively allocated frequency shift, e.g. $\Delta f_n$.

Furthermore, the embodiments for enabling access to at least one wireless tag 301, 302, 303 in a wireless communications network 100 described above may be implemented through one or more processing circuitries, such as, e.g. the processing circuitry 1010 in the AP 110, 111, 112 depicted in FIG. 10, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1010 in the AP 110, 111, 112. The computer program code may e.g. be provided as pure program code in the AP 110, 111, 112 or on a server and downloaded to the AP 110, 111, 112. Thus, it should be noted that the modules of the AP 110, 111, 112 may in some embodiments be implemented as computer programs stored in memory, e.g. in the memory modules 1020 in FIG. 10, for execution by processing circuitries or processing modules, e.g. the processing circuitry 1010 of FIG. 10.

Those skilled in the art will also appreciate that the processing circuitry 1010 and the memory 1020 described above may refer to a combination of analog and digital circuits, and/or one or more processors configured with software and/or firmware, e.g. stored in a memory, that when executed by the one or more processors such as the processing circuitry 1020 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage wireless devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

Abbreviations

IoT Internet-of-Things
AP Access Point
DL Downlink
UL Uplink
RF Radio Frequency
RFID Radio Frequency Identification
BAP Battery-Assisted Passive

The invention claimed is:

1. A method performed by a network control entity for enabling access to at least one wireless tag in a wireless communications network, wherein the wireless communications network comprises two or more access points, APs, the method comprising:
configuring at least one first AP to transmit, in a second time period preceding a first time period, a scheduling grant to the at least one wireless tag indicating that a radio frequency signal is to be expected in the first time period;
configuring the at least one first AP to transmit the radio frequency signal in the first time period, and
configuring at least one second AP to receive, in the first time period, at least one radio signal reflected from the at least one wireless tag using the transmitted radio frequency signal.

2. The method according to claim 1, wherein the configuring further comprises:
configuring the at least one second AP to allocate two subsets of frequency resources within a determined set of frequency resources to the at least one wireless tag in the first time period; and
configuring the at least one second AP to receive, in the first time period, the at least one radio signal reflected from the at least one wireless tag in at least one of the allocated two subsets of frequency resources.

3. The method according to claim 2, wherein the configuring further comprises:
configuring the at least one first AP to refrain from transmitting, in the first time period, on the subsets of frequency resources allocated to the at least one wireless tag.

4. The method according to claim 1, wherein the configuring further comprises:
allocating a frequency shift to each of the at least one wireless tag, respectively, wherein the allocated frequency shift is to be used by the at least one wireless tag when reflecting a radio signal using the transmitted radio frequency signal; and
configuring one or more AP to configure the at least one wireless tag to reflect a radio signal by shifting the transmitted radio frequency signal in accordance with the respectively allocated frequency shift.

5. The method according to claim 1, further comprising:
determining that the at least one first AP is to transmit a radio frequency signal in a first time period, and that at least one second AP is to receive, in the first time period, at least one radio signal reflected from at least one wireless tag using the transmitted radio frequency signal; and wherein the determining further comprises grouping each of at least one first AP in a transmitting, TX, group, wherein each of at least one first AP in the TX group synchronize their downlink, DL, time periods and transmit their radio frequency signals simultaneously, and grouping each of the at least one second AP in a receiving, RX, group, wherein each of the at least one second AP in the RX group synchronize their uplink, UL, time periods and receive the reflected radio signals from the at least one wireless tag simultaneously.

6. The method according to claim 1, wherein the network control entity is comprised in, or form a part of, one or more of the APs or is separate network unit in the wireless communications network, or is provided as a service by a remote data processing network.

7. The method according to claim 1, wherein the transmitted radio frequency signal is a modulated Radio Frequency, RF, carrier; and wherein the at least one wireless tag are semi-passive or passive devices that are powered by the transmitted radio frequency signal.

8. A network control entity for enabling access to at least one wireless tag in a wireless communications network, wherein the wireless communications network comprise two or more access points, APs, wherein the network control entity is adapted to:
configure at least one first AP to transmit, in a second time period preceding a first time period, a scheduling grant to the at least one wireless tag indicating that a radio frequency signal is to be expected in the first time period;
configure the at least one first AP to transmit the radio frequency signal in the first time period, and configure at least one second AP to receive, in the first time period, at least one radio signal reflected from the at least one wireless tag using the transmitted radio frequency signal.

9. The network control entity according to claim 8, further adapted to configure the at least one second AP to:
allocate two subsets of frequency resources within a determined set of frequency resources to the at least one wireless tag in the first time period; and
receive, in the first time period, the at least one radio signal reflected from the at least one wireless tag in at least one of the allocated two subsets of frequency resources.

10. The network control entity according to claim 9, further adapted to configure the at least one first AP to refrain from transmitting, in the first time period, on the subsets of frequency resources allocated to the at least one wireless tag.

11. The network control entity according to claim 8, further adapted to:
allocate a frequency shift to the at least one wireless tag, wherein the allocated frequency shift is to be used by the at least one wireless tag when reflecting a radio signal using the transmitted radio frequency signal; and
configure one or more of the at least one first and/or second AP to configure the at least one wireless tag to reflect a radio signal by shifting the transmitted radio frequency signal in accordance with a respectively allocated frequency shift.

12. The network control entity according to claim 8, further adapted to:
determine that the at least one first AP is to transmit a radio frequency signal in a first time period, and that at least one second AP is to receive, in the first time period, at least one radio signal reflected from at least one wireless tag using the transmitted radio frequency signal; and
group each of at least one first AP in a transmitting, TX, group, wherein each of at least one first AP in the TX group synchronize their downlink, DL, time periods and transmit their radio frequency signals simultaneously, and group each of the at least one second AP in a receiving, RX, group, wherein each of the at least one second AP in the RX group synchronize their uplink, UL, time periods and receive the reflected radio signals from the at least one wireless tag simultaneously.

13. A method performed by an access point, AP, for enabling access to at least one wireless tag in a wireless communications network, the method comprising:
obtaining configuration information;
transmitting, in a second time period preceding a first time period, a scheduling grant to the at least one wireless tag indicating that a radio frequency signal is to be expected in the first time period; and
based on the obtained configuration information, transmitting the radio frequency signal in the first time period, or receiving, in the first time period, at least one radio signal reflected from the at least one wireless tag using the transmitted radio frequency signal.

14. The method according to claim 13, wherein the obtained configuration information indicates that the AP is to transmit a radio frequency signal in a first time period, or that the AP is to receive, in the first time period, at least one radio signal reflected from at least one wireless tag using the transmitted radio frequency signal.

15. The method according to claim 13, further comprising, when the AP is to receive at least one reflected radio signal in the first time period,
- synchronizing its uplink, UL, time periods with one or more APs in the wireless communications network also configured to receive at least one reflected radio signal in the first time period;
- allocating two subsets of frequency resources within a determined set of frequency resources to the at least one wireless tag in the first time period; and
- receiving, in the first time period, the at least one radio signal reflected from the at least one wireless tag in at least one of the allocated two subsets of frequency resources $(f-\Delta f_n, f+\Delta f_n)$.

16. The method according to claim 13, further comprising, when the AP is to transmit a radio frequency signal in the first time period,
- synchronizing its downlink, DL, time periods with one or more APs in the wireless communications network also configured to transmit a radio frequency signal in the first time period;
and
- refraining from transmitting, in the first time period, on subsets of frequency resources allocated to the at least one wireless tag.

17. The method according to claim 13, further comprising:
- configuring the at least one wireless tag to reflect a radio signal by shifting the transmitted radio frequency signal in accordance with a respectively allocated frequency shift.

18. An access point, AP, for enabling access to at least one wireless tag in a wireless communications network, wherein the AP is adapted to:
- obtain configuration information,
- transmit, in a second time period preceding a first time period, a scheduling grant to the at least one wireless tag indicating that a radio frequency signal is to be expected in the first time period; and, based on the obtained configuration information, transmit the radio frequency signal in the first time period or receive, in the first time period, at least one radio signal reflected from the at least one wireless tag using the transmitted radio frequency signal.

19. The AP according to claim 18, wherein the obtained configuration information indicates that the AP is to transmit a radio frequency signal in a first time period, or that the AP is to receive, in the first time period, at least one radio signal reflected from at least one wireless tag using the transmitted radio frequency signal.

20. The AP according to claim 18, further adapted to, when the AP is to receive at least one reflected radio signal in the first time period,
- synchronize its uplink, UL, time periods with one or more APs in the wireless communications network also configured to receive at least one reflected radio signal in the first time period;
- allocate two subsets of frequency resources within a determined set of frequency resources to the at least one wireless tag in the first time period; and
- receive at least one reflected radio signal in the first time period, allocate two subsets of frequency resources within a determined set of frequency resources to the at least one wireless tag in the first time period.

* * * * *